(12) United States Patent
Tanaka

(10) Patent No.: US 8,955,361 B2
(45) Date of Patent: Feb. 17, 2015

(54) STEERING DEVICE

(75) Inventor: Takahiro Tanaka, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/376,981

(22) PCT Filed: Jul. 13, 2011

(86) PCT No.: PCT/JP2011/065940
§ 371 (c)(1),
(2), (4) Date: Apr. 5, 2013

(87) PCT Pub. No.: WO2012/023365
PCT Pub. Date: Feb. 23, 2012

(65) Prior Publication Data
US 2013/0180297 A1    Jul. 18, 2013

(30) Foreign Application Priority Data
Aug. 20, 2010    (JP) ................................. 2010-184972

(51) Int. Cl.
*B60R 25/02*    (2013.01)
*B60R 25/021*    (2013.01)
(52) U.S. Cl.
CPC ....... *B60R 25/02115* (2013.01); *B60R 25/0211* (2013.01)
USPC ............................................. 70/184; 70/252

(58) Field of Classification Search
USPC ........................................... 70/181–187, 252
See application file for complete search history.

(56) References Cited

U.S. PATENT DOCUMENTS

| 7,104,097 | B2 * | 9/2006 | Zillmann | 70/186 |
|---|---|---|---|---|
| 7,111,480 | B2 * | 9/2006 | Dimig et al. | 70/186 |
| 7,703,309 | B2 * | 4/2010 | Okuno et al. | 70/186 |
| 7,823,426 | B2 * | 11/2010 | Okuno et al. | 70/186 |
| 8,001,814 | B2 * | 8/2011 | Okada et al. | 70/186 |
| 8,136,376 | B2 * | 3/2012 | Tsukano et al. | 70/252 |
| 8,272,239 | B2 * | 9/2012 | Fong | 70/185 |
| 2004/0251671 | A1 * | 12/2004 | Zillmann | 70/182 |
| 2008/0178644 | A1 * | 7/2008 | Okuno et al. | 70/187 |

FOREIGN PATENT DOCUMENTS

JP    2002-337663    11/2002

* cited by examiner

*Primary Examiner* — Christopher Boswell
(74) *Attorney, Agent, or Firm* — Crowell & Moring LLP

(57) ABSTRACT

In a steering device having a steering lock device, stress applied to a base portion of a flange section is reduced. Relief portions have round corners formed where the relief portions meet the outer periphery of the outer column, respectively. With the relief portions concave by β3 from the mounting surface, radius R1 of each of the round corners of the relief portions can be made larger than radius R2 of a round corner of the mounting surface. This makes it possible to avoid interference between the relief portions and the corner at an inner end, in the vehicle width direction, of the right clamping surface of the steering lock device.

7 Claims, 15 Drawing Sheets

STEERING DEVICE

Technical Field

The present invention relates to a steering device, particularly to a steering device having a steering lock device for locking, when an ignition key is turned into a lock position and pulled out from the key hole, the steering wheel making it, for theft prevention, unrotatable.

Background Art

In a steering device having a steering lock device, when an ignition key is turned into a lock position and pulled out from the key hole, a lock pin projects toward the axis of the steering shaft. As a result, an end portion of the lock pin engages a key lock hole formed in a key lock collar press-fitted to the outer periphery of the steering shaft so as to fix the steering shaft to the outer column not to allow the steering shaft to rotate.

Existing steering devices having a steering lock device have a separate housing for the steering lock device bolted to a flange section of a column which axially rotatably supports a steering shaft.

In cases where the column is made of an aluminum alloy, however, the strength of the column is small. When, in a key-locked state (the lock pin is engaged with the key lock hole), a large rotating torque is applied to the steering wheel, a large bending moment is applied to a base portion of the flange section. When this occurs with a round corner of the base portion of the flange section having a small radius, stress concentrates on the base portion possibly causing the base portion to be cracked.

In the steering device disclosed in Japanese Unexamined. Patent Application Publication No. 2002-337663, a flange section made of thick steel plate is welded to a column made of a steel pipe enhancing the mounting rigidity between the column and the housing for a steering lock device. The column used in the steering device disclosed in Japanese Unexamined Patent Application Publication No. 2002-337663, is, however, made of steel, and no measure for reducing the stress concentration on a root portion of a flange section attached to a column made of an aluminum alloy is disclosed.

In the steering device disclosed in Japanese Unexamined Patent Application Publication No. 2002-337663, an engaging convex part of the steering lock device is tightly fitted in a through hole formed in the column, and the bending moment applied to the lock pin in a key-locked state is born by both the flange section and the through hole. In cases where the column is made of an aluminum alloy, however, stress may concentrates around the through hole possibly causing the column to be cracked. Employing, to prevent the column from being cracked, a structure in which the engaging convex part of the steering lock device does not come into contact with the through hole, however, further increases the stress applied to the base portion of the flange section and intensifies the stress concentration there.

SUMMARY OF INVENTION

Technical Problem

An object of the present invention is to provide a steering device having a steering lock device, wherein stress concentration on a base portion of a flange section attached with the steering lock device is reduced.

Solution to Problem

The above object is achieved as follows. Namely, a steering device according to a first aspect of the invention comprises: a steering shaft which is axially rotatably supported by a column and which can be attached with a steering wheel at a portion thereof toward a vehicle rear side; a steering lock device which is attached to the column and which causes a lock pin operated by operation of an ignition key to engage the steering shaft so as to lock the steering shaft not to allow the steering shaft to rotate; a flange section formed integrally with the column to project radially outwardly from the outer peripheral surface of the column and including amounting surface to which a housing to accommodate the steering lock device is attached; a bolt hole which is formed in the flange section and through which a bolt for clamping the housing to the mounting surface is inserted; a relief portion which is concavely formed on the mounting surface to be close to the bolt hole and which extends to a base portion of the flange section; and a round corner portion formed in the relief portion to be where the relief portion meets the outer peripheral surface of the column.

According to a second aspect of the invention, in the steering device according to the first aspect of the invention, the relief portions are formed both on a side toward a vehicle front of the bolt hole and on a side toward a vehicle rear of the bolt hole.

According to a third aspect of the invention, in the steering device according to the first aspect of the invention, the bolt hole is formed near an end portion, in a column axis direction, of the flange section.

According to a fourth aspect of the invention, in the steering device according to the first aspect of the invention, a bending moment applied to the lock pin when the lock pin is engaged with the steering shaft is born only by the flange section.

According to a fifth aspect of the invention, in the steering device according to the second aspect of the invention, a bending moment applied to the lock pin when the lock pin is engaged with the steering shaft is born only by the flange section.

According to a sixth aspect of the invention, in the steering device according to the third aspect of the invention, a bending moment applied to the lock pin when the lock pin is engaged with the steering shaft is born only by the flange section.

According to a seventh aspect of the invention, in the steering device according to one of the first to sixth aspects of the invention, the column is formed of an aluminum alloy or a magnesium alloy.

Advantageous Effects of Invention

The steering device according to the present invention comprises: a flange section formed integrally with the column to project radially outwardly from the outer peripheral surface of the column and including amounting surface to which a housing to accommodate the steering lock device is attached; a bolt hole which is formed in the flange section and through which a bolt for clamping the housing to the mounting surface is inserted; a relief portion which is concavely formed on the mounting surface to be close to the bolt hole and which extends to a base portion of the flange section; and a round corner portion formed in the relief portion to be where the relief portion meets the outer peripheral surface of the column.

Even though when, in a key-locked state, a large rotating torque is applied to the steering wheel causing the lock pin to be subjected to a bending moment, a large stress is applied to a base portion of a flange section provided near a bolt hole, the stress applied to a round corner formed in the base portion of the flange section can be reduced by allowing the round corner to be formed with a large radius.

DESCRIPTION OF EMBODIMENTS

Figure 1:
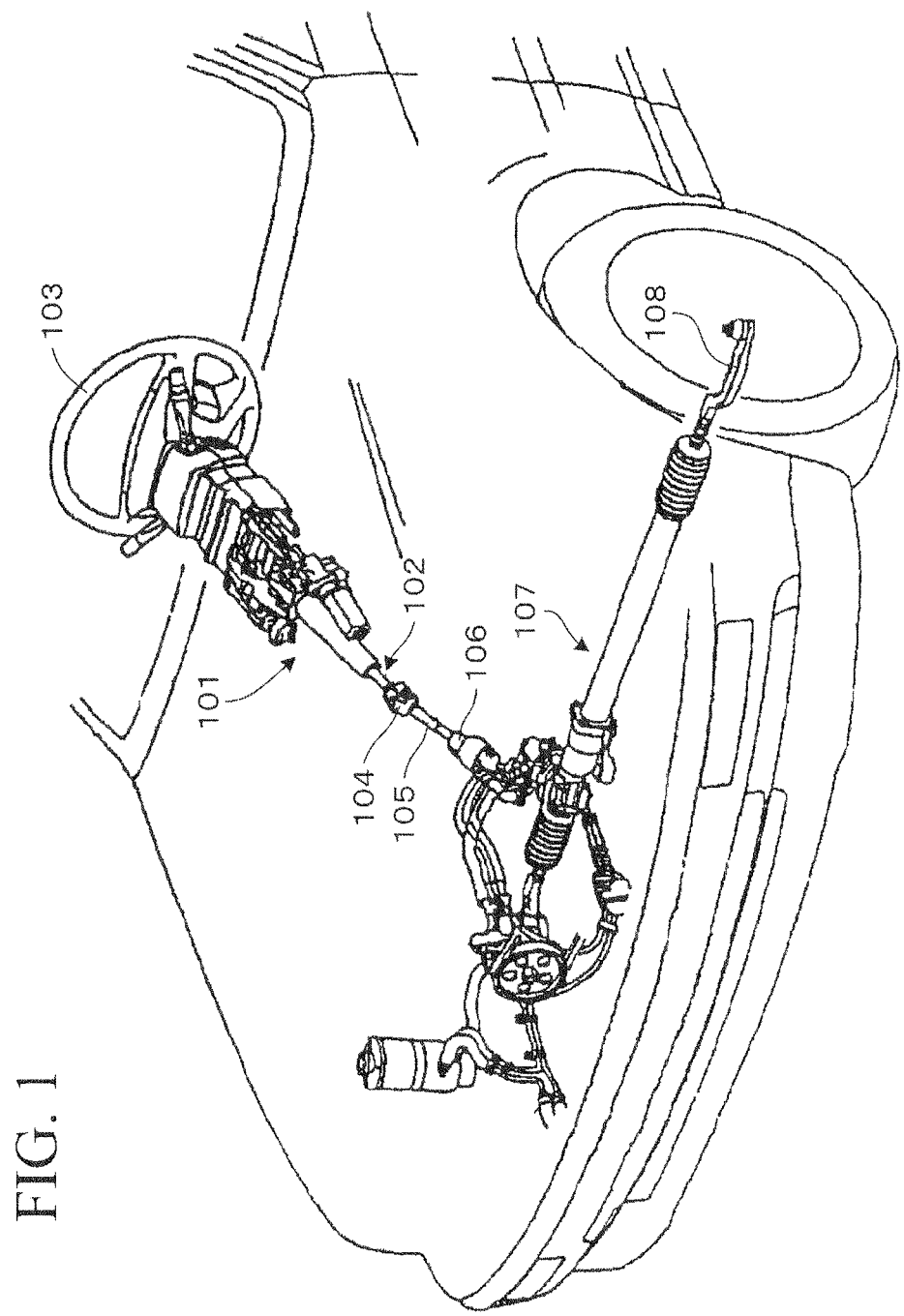
FIG. 1 is an overall perspective view of a steering device 101 installed in a vehicle according to an embodiment of the present invention.

FIG. 1 is an overall perspective view of a steering device 101 installed in a vehicle according to an embodiment of the present invention. The steering device 101 axially rotatably supports a steering shaft 102. The steering shaft 102 is attached, at an upper end thereof (an end toward the vehicle rear), with a steering wheel 103 and connected, at a lower end thereof (an end toward the vehicle front), with an intermediate shaft 105 via a universal joint 104.

The intermediate shaft 105 is connected, at a lower end thereof, with a universal joint 106 which is connected with a steering gear 107 including a rack and pinion mechanism.

When a driver turns the steering wheel 103, the turning force is transmitted to the steering gear 107 via the steering shaft 102, universal joint 104, intermediate shaft 105, and the universal joint 106, thereby moving a tie rod 108 to change the steering angle of wheels.

Figure 2:
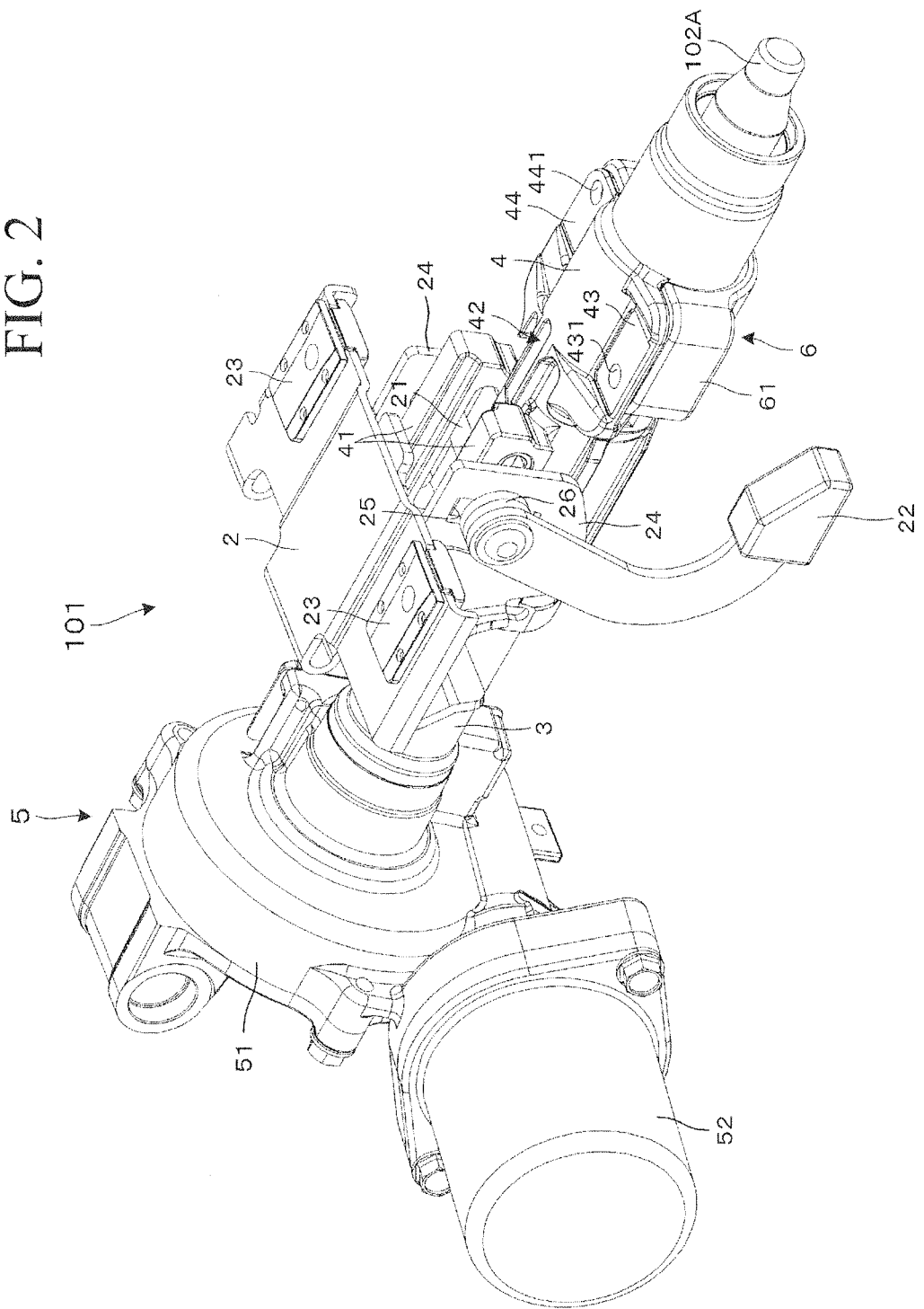
FIG. 2 is a perspective view, as seen from above on the left side toward the vehicle rear, of an essential part of the steering device 101 according to the present embodiment of the present invention.

As shown in FIG. 2, the steering device 101 of the present embodiment of the present invention includes a mounting bracket 2 for mounting to the vehicle body, an inner column (lower column) 3, and an outer column (upper column) 4. The mounting bracket 2 is fixed, via capsules 23, to the vehicle body, not shown.

The cylindrical inner column 3 is fitted, at an outer peripheral portion thereof toward the vehicle rear (toward the right side as seen in FIG. 2), with the inner peripheral surface of the hollow cylindrical outer column 4 such that the outer column 4 is telescopically movable (in parallel with the center axis of the inner column 3). The outer column 4 is made of a cast aluminum alloy formed, for example, by die casting. The outer column 4 axially rotatably supports an upper steering shaft 102A. An end portion toward the vehicle rear of the upper steering shaft 102A is fixed with the steering wheel 103 (see FIG. 1).

The inner column 3 is attached, at a portion thereof toward the vehicle front, with an assist device (steering assisting part) 5 for providing an auxiliary torque. The assist device 5 includes a gear housing 51 to which an electric motor 52 is fixed. A worm wheel inside the gear housing 51 engages a worm coupled to the rotary shaft, not shown, of the electric motor 52.

The direction and magnitude of the torque applied from the steering wheel 103 to the upper steering shaft 102A is detected by a torque sensor. The electric motor 52 is driven according to the torque direction and magnitude detected by the torque sensor so as to generate, via a deceleration mechanism including a worm and a worm wheel, an auxiliary torque of a proper direction and magnitude.

An end portion toward the vehicle front of the gear housing 51 is supported by the vehicle body such that its tilt is adjustable based on a tilt axis, not shown, serving as a tilt supporting axis. The outer column 4 is provided, in an upper portion thereof toward the vehicle top, with clamp members 41 formed to project toward the vehicle top on both the left and right sides in the vehicle width direction. As shown in FIGS. 2 to 15, outer sides 411 of the clamp members 41 are held, to be slidingly tiltable and telescopically slidable, between left and right side plates 24 of the mounting bracket 2.

The clamp members 41 each have a long telescopic adjustment slot 412 extending in the axial direction of the outer column 4. The left and right side plates 24 of the mounting brackets 2 each have a long tilt adjusting slot 25 extending in the vehicle height direction. A round clamping rod 21 is inserted through the long tilt adjusting slots 25 and long telescopic adjustment slots 412.

When an operation lever 22 attached to an end portion of the clamping rod 21 is swung, a cam lock mechanism 26 is actuated to cause the left and right side plates 24 of the mounting bracket 2 to be clamped. As a result, the left and right clamp members 41 attached to the outer column 4 are strongly clamped by the left and right side plates 24 of the mounting bracket 2.

The outer column 4 has, on an upper side thereof toward the vehicle top, a slit 42 formed through the thickness between the outer periphery and inner periphery thereof. The slit 42 is a long slit extending, in the axial direction of the outer column 4, between the clamp members 41. When the left and right side plates 24 of the mounting bracket 2 are clamped, the width in the vehicle width direction of the slit 42 is reduced causing the inner peripheral diameter of the outer column 4 to contract to strongly clamp the outer periphery of the inner column 3. This allows the outer column 4 to be clamped by the mounting bracket 2 at a desired tilt and telescopic position.

Figure 3:
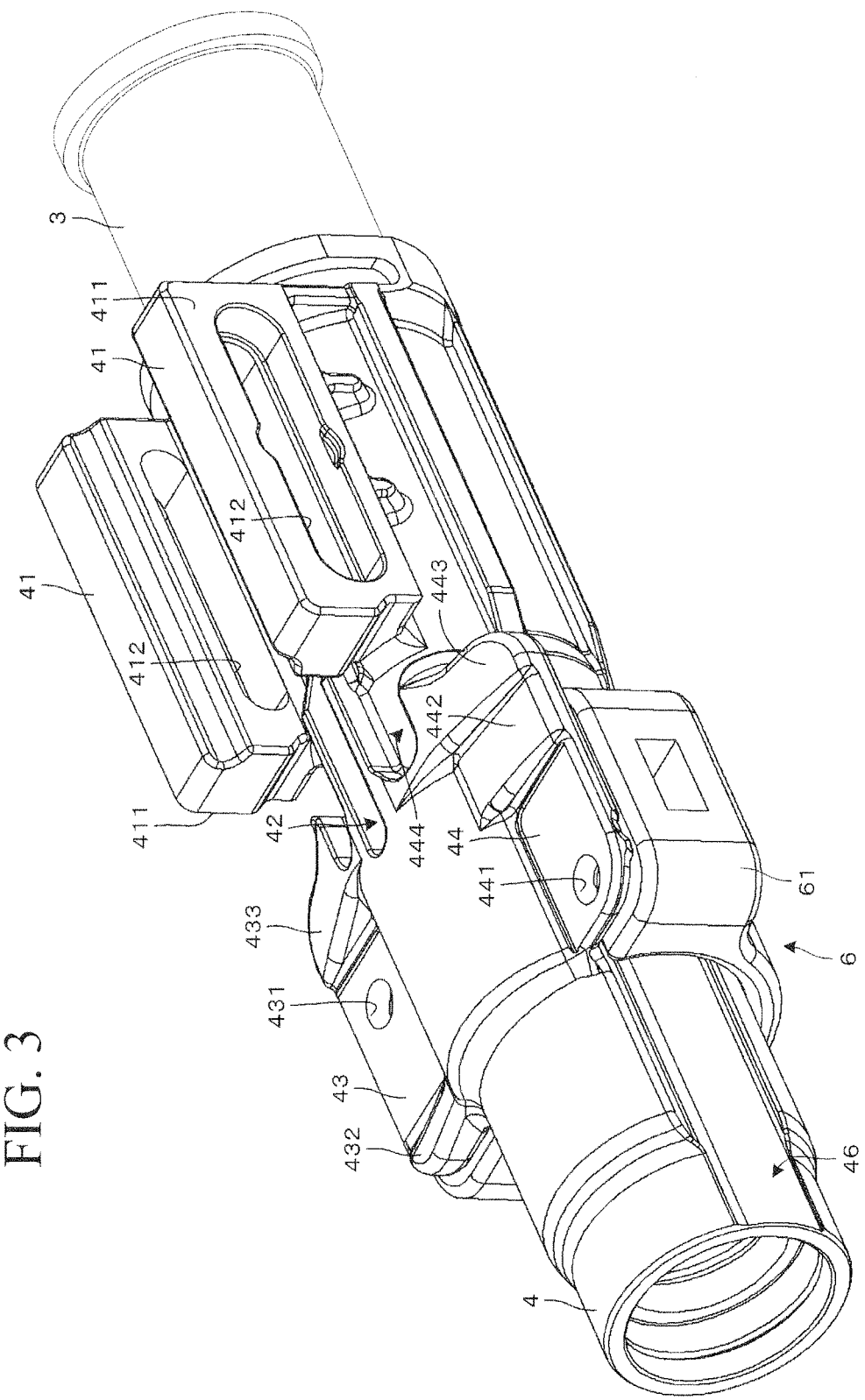
FIG. 3 is a perspective view, as seen from above on the right side toward the vehicle rear, of the steering device 101 of the present embodiment with a mounting bracket for mounting to the vehicle body removed.
Figure 6:
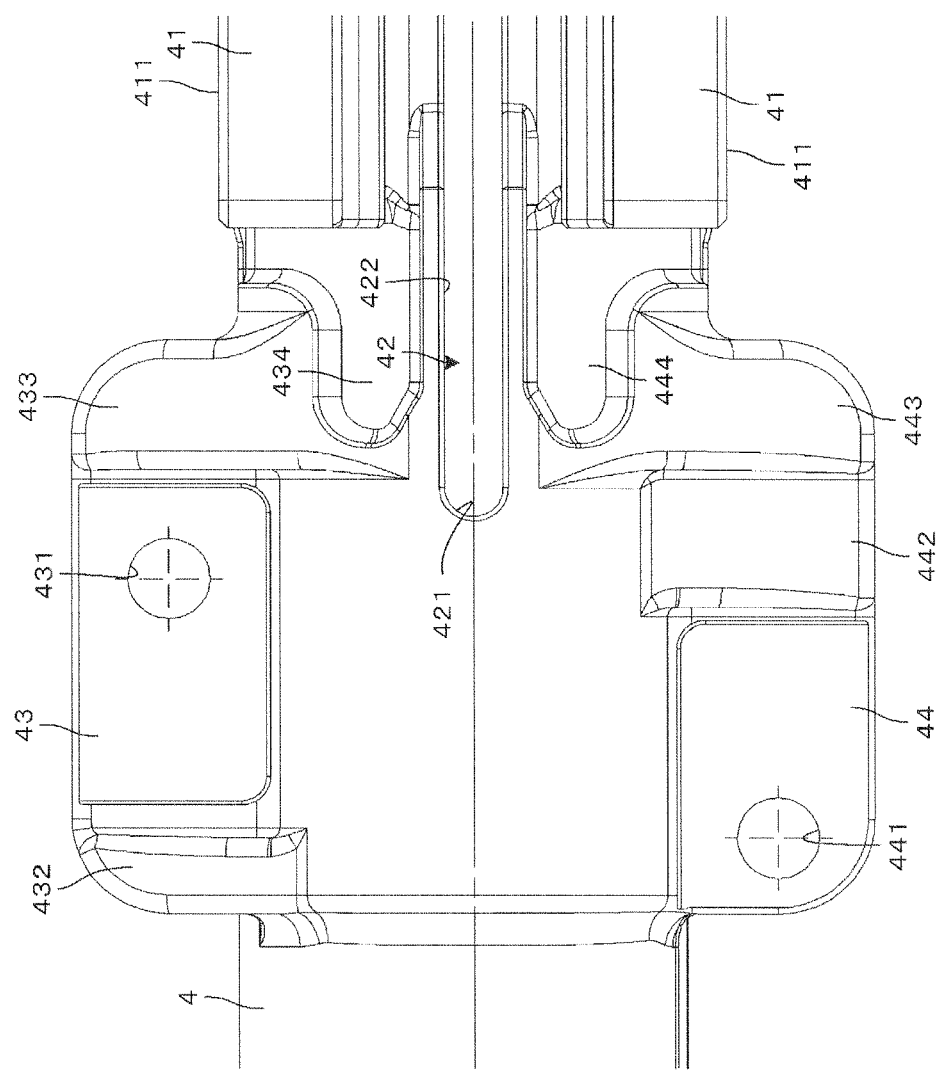
FIG. 6 is en enlarged plan view of a portion around the flange sections of the column assembly.
Figure 7:
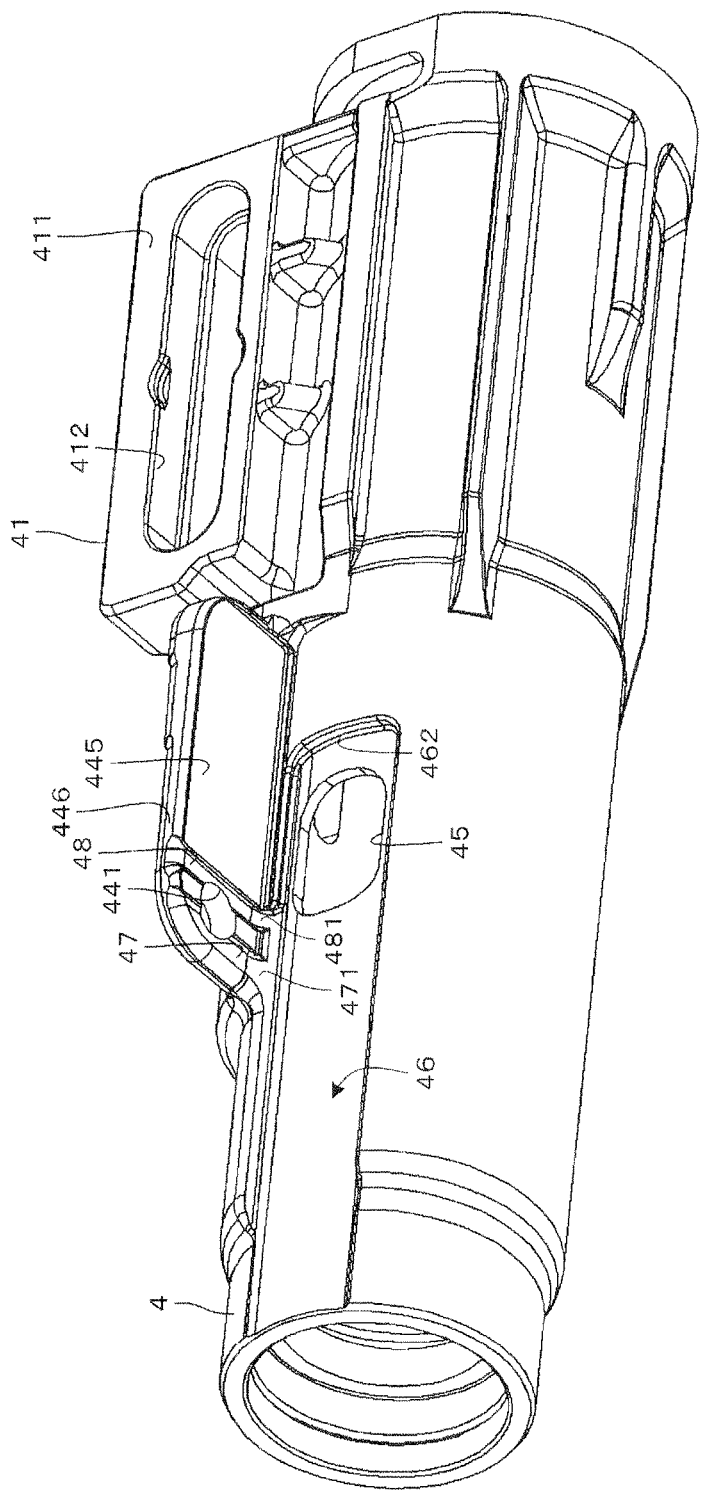
FIG. 7 is a perspective view, as seen from below on the right side toward the vehicle rear, of the column assembly shown in FIG. 4.

The hollow cylindrical outer column 4 has a pair of flange sections 43 and 44 formed integrally therewith on the left and right sides, in the vehicle width direction, toward the vehicle rear. The flange sections 43 and 44 are correspondingly positioned on the outer periphery of the outer column 4 and project radially outwardly, respectively. The flange sections 43 and 44 have bolt holes 431 and 441, respectively. As shown in FIGS. 3 and 6, the volt hole 431 is formed in a portion near the end toward the vehicle front (rightward as seen in FIGS. 3 and 6) of the left flange section 43 as seen from the vehicle rear side, and the volt hole 441 is formed in a portion near the end toward the vehicle rear (leftward as seen in FIGS. 3 and 6) of the right flange section 44 as seen from the vehicle rear side.

Also, as shown in FIGS. 3 and 6, the left flange section 43 is provided with flange-like ribs 432 and 433 formed integrally therewith. The ribs 432 and 433 reinforce the flange section 43 by connecting the flange section 43 to the outer periphery of the outer column 4. The rib 432 is formed on a side toward the vehicle rear (leftward as seen in FIGS. 3 and 6) of the left flange section 43, and the rib 433 is formed on a side toward the vehicle front (rightward as seen in FIGS. 3 and 6) of the left flange section 43. The right flange section 44 is provided with flange-like ribs 442 and 443 formed integrally therewith. The ribs 442 and 443 reinforce the flange section 44 by connecting the flange section 44 to the outer periphery of the outer column 4. The rib 442 is formed on a side toward the vehicle front (rightward as seen in FIGS. 3 and 6) of the right flange section 44, and the rib 443 is formed, integrally with the rib 442, on a side toward the vehicle front of the rib 442.

The ribs 432, 433, 442 and 443 are formed such that their thickness in a direction perpendicular to the axial direction of the outer column 4 increases toward the center axis of the outer column 4. The ribs 433 and 443 closer to the vehicle front than the ribs 432 and 442, respectively, extend longer toward the center axis of the outer column 4 than the ribs 432 and 442. Namely, the ribs 433 and 443 each extend to a vicinity of a closed end 421 toward the vehicle rear of the slit 42 thereby reinforcing the strength of the closed end 421 of the slit 42 where stress concentrates when the outer column 4 is telescopically clamped.

The outer column 4 is also provided with thin parts 434 and 444 formed on the outer periphery thereof to be outside, in the vehicle width direction, a parallel portion 422 of the slit 42 and close to where the parallel portion 422 and the closed end 421 meet. The thin parts 434 and 444 allow the slit-42 width of the parallel portion 422 to be reduced by a small force when the outer column 4 is telescopically clamped. Namely, they make it easier to strongly clamp the outer periphery of the inner column 3 so as to intensify telescopic clamping.

As shown in FIGS. 4 and 11 to 15, a housing 61 of the steering lock device 6 is attached to mounting surfaces 435 and 445 provided on an underside of the flange section 43 and ribs 432 and 433 and on an underside of the flange section 44 and ribs 442 and 443, respectively. The mounting surfaces 435 and 445 extend in parallel along the axial direction of the outer column 4. The housing 61 is made of an aluminum alloy and has, on an upper side thereof, a circular concave surface 62. Flat clamping surfaces 63 are formed at both ends in the vehicle width direction of the circular concave surface 62. The clamping surfaces 63 have female threads 64 formed therein to correspond, respectively, to the bolt holes 431 and 441 formed in the flange sections 43 and 44.

When an ignition key, not shown, is tuned into a lock position and pulled out from the key hole, an elliptical lock pin 66 projects from an elliptical engaging convex part 65 formed on a right side of the circular concave surface 62. The engaging convex part 65 is formed to project from the circular concave surface 62 toward the outer periphery of the outer column 4. The upper steering shaft 102A is fitted with a key lock collar 67 press-fitted to the outer periphery thereof. A leading end portion of the lock pin 66 projected from the engaging convex part 65 engages a key lock hole 671 formed in the key lock collar 67 thereby locking the steering wheel 103 not to allow it to rotate.

Figure 4:
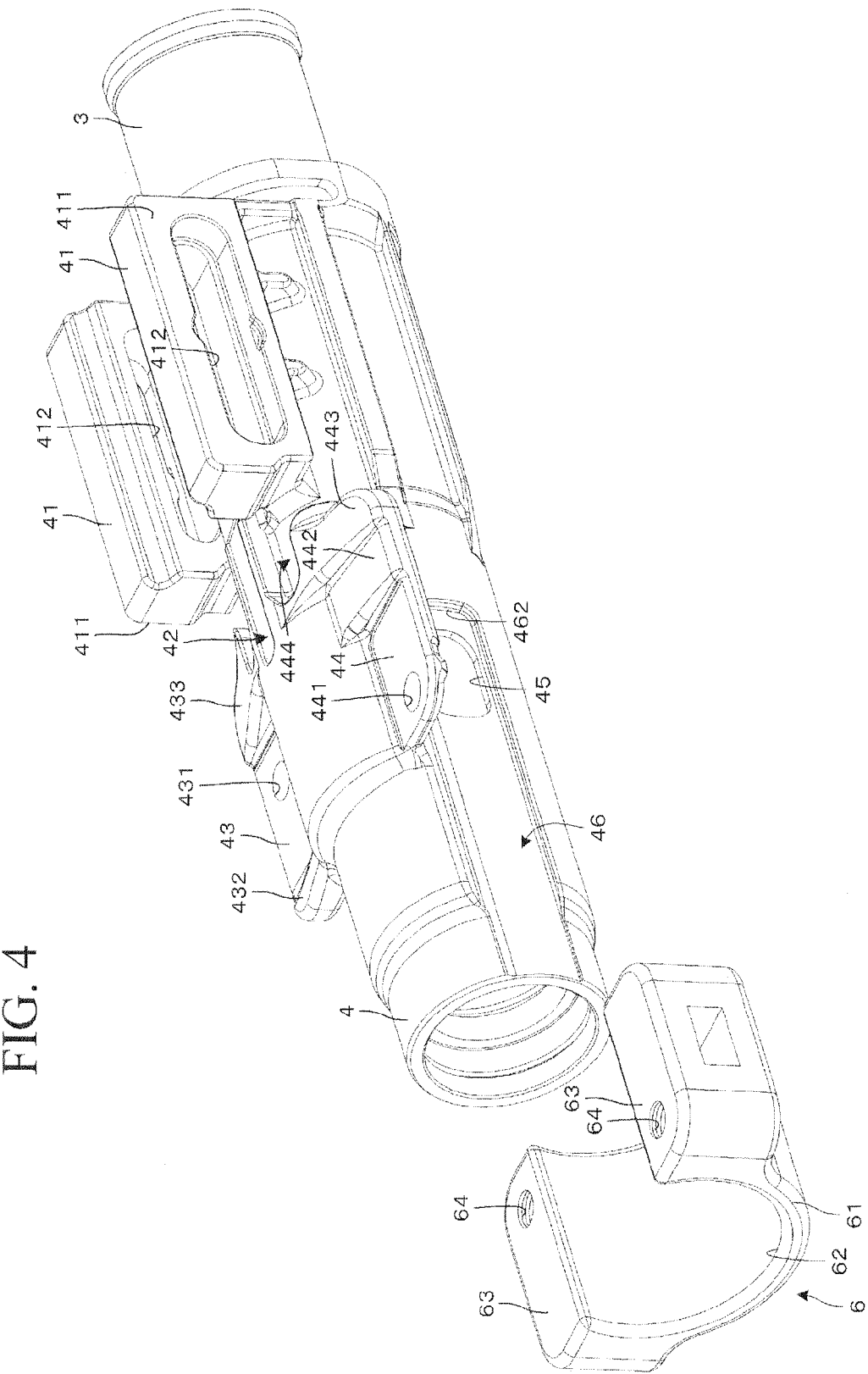
FIG. 4 is a perspective view, as seen from above on the right side toward the vehicle rear, of the steering device 101 in a state before a steering lock device is attached to the column assembly thereof.
Figure 5:
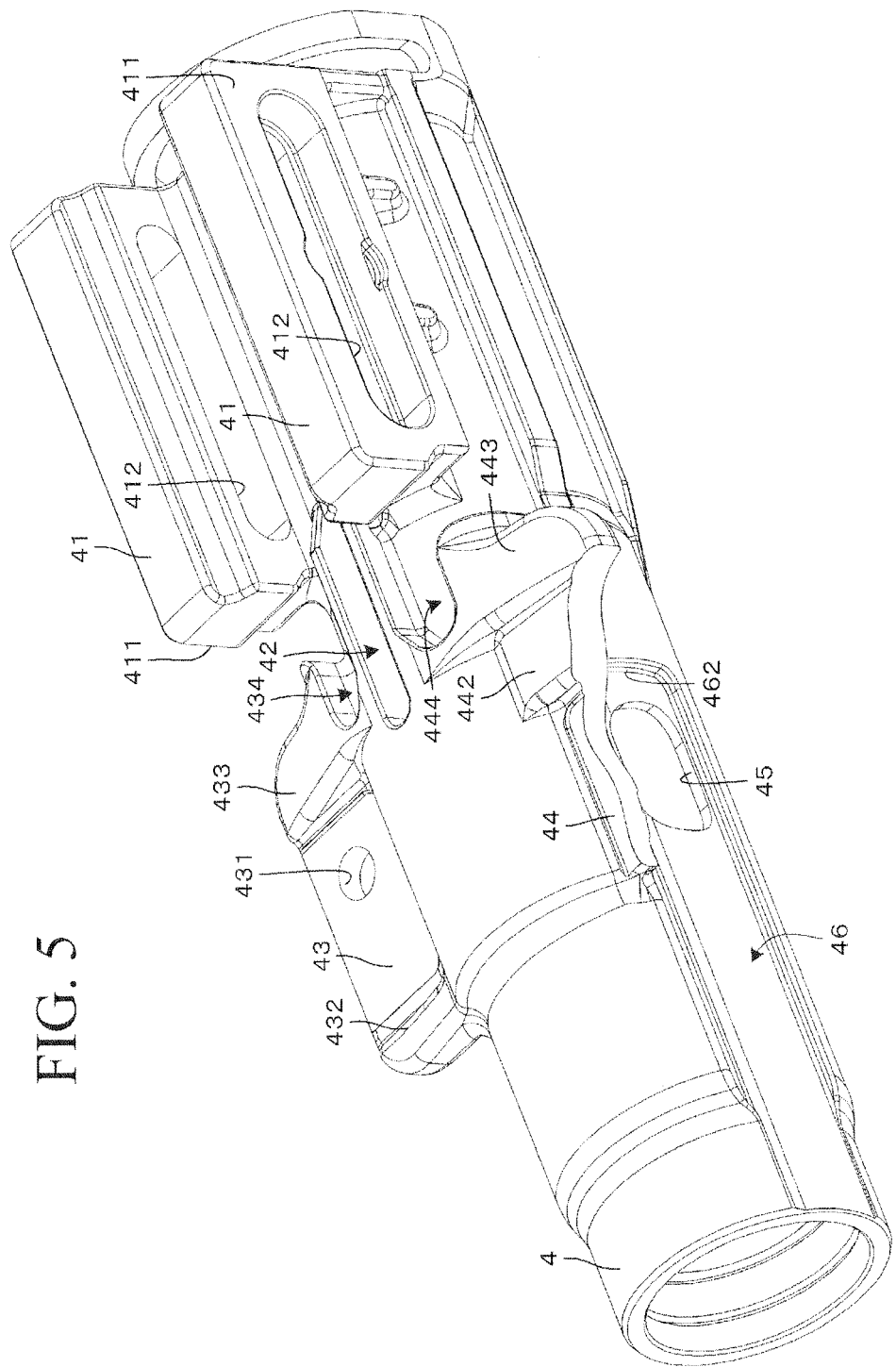
FIG. 5 is a perspective view, as seen from above on the right side toward the vehicle rear, of the column assembly alone shown in FIG. 4.

The outer column 4 has an elliptical through hole 45 formed in a right side thereof. The elliptical through hole 45 is sized such that, when the lock pin 66 is inserted therein, a slight gap is formed between the through hole 45 and the outer periphery of the lock pin 66. The through hole 45 is formed to be circumferentially spaced 90 degrees from the slit 42 of the outer column 4. The outer column 4 also has a bottomed guide groove 46 formed on a right side thereof. The guide groove 46 extends, in the axial direction of the outer column 4, from near the elliptical through hole 45 to the end toward the vehicle rear (the left end as seen in FIG. 4) of the outer column 4. The width (groove width) W1 in the vehicle height direction of the guide groove 46 (see FIG. 12) is slightly larger than the width W2 in the vehicle height direction of the engaging convex part 65 of the steering lock device 6.

The guide groove 46 has a closed end 462 (see FIG. 4) closer to the vehicle front than the elliptical through hole 45 and is open ended at the end toward the vehicle rear of the outer column 4. The engaging convex part 65 has a circular concave surface (to oppose a bottom surface 461 of the guide groove 46) 651 formed on a leading end portion thereof. The outer diameter R1 (see FIG. 12) of the bottom surface 461 of the guide groove 46 is slightly smaller than the inner diameter R2 of the circular concave surface 651.

As shown in FIG. 4, the steering lock device 6 is assembled to the outer column 4 by inserting the engaging convex part 65 of the steering lock device 6 from the vehicle rear side into the guide groove 46, then sliding the steering lock device 6 along the guide groove 46 toward the vehicle front. As shown in FIG. 3, when the end toward the vehicle front of the engaging convex part 65 abuts against the closed end 462 of the guide groove 46, the female threads 64 formed in the housing 61 of the steering lock device 6 are positioned to correspond to the bolt holes 431 and 441 formed in the flange sections 43 and 44. At the same time, the lock pin 66 of the steering lock device 6 is positioned to correspond to the key lock hole 671 formed in the key lock collar 67.

In the above state, bolts 68 are screwed, through the bolt holes 431 and 441, in the female threads 64 and tightened to assemble the housing 61 to the outer column 4. This tightly fits the clamping surfaces 63 of the housing 61 of the steering lock device 6 to the mounting surface 435 on the underside of the flange section 43 and ribs 432 and 433 and to the mounting surface 445 on the underside of the flange section 44 and ribs 442 and 443.

Figure 12:
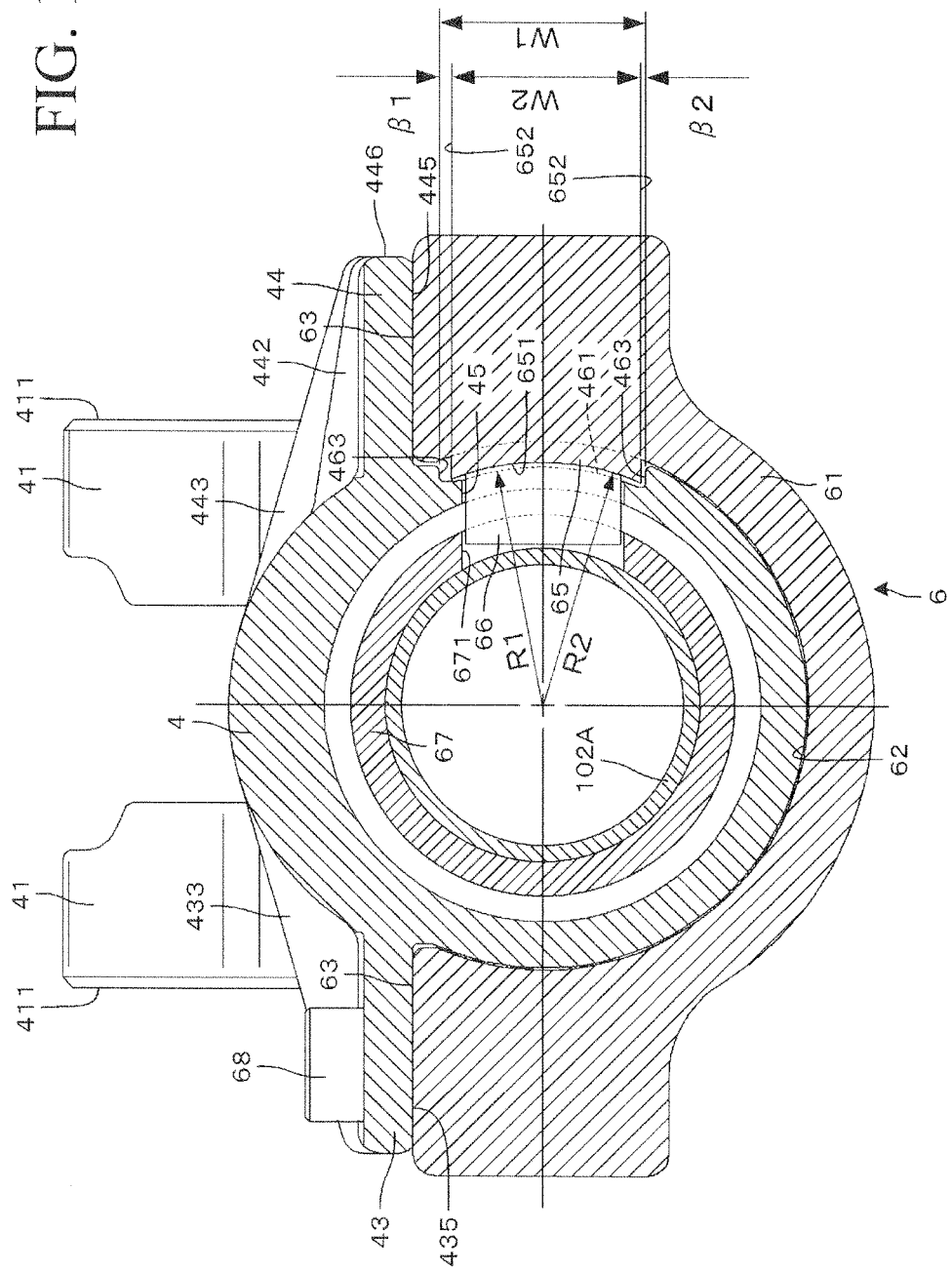
FIG. 12 is a cross-sectional view, including the steering lock device attached to the column assembly, taken along line A-A in FIG. 10.
Figure 13:
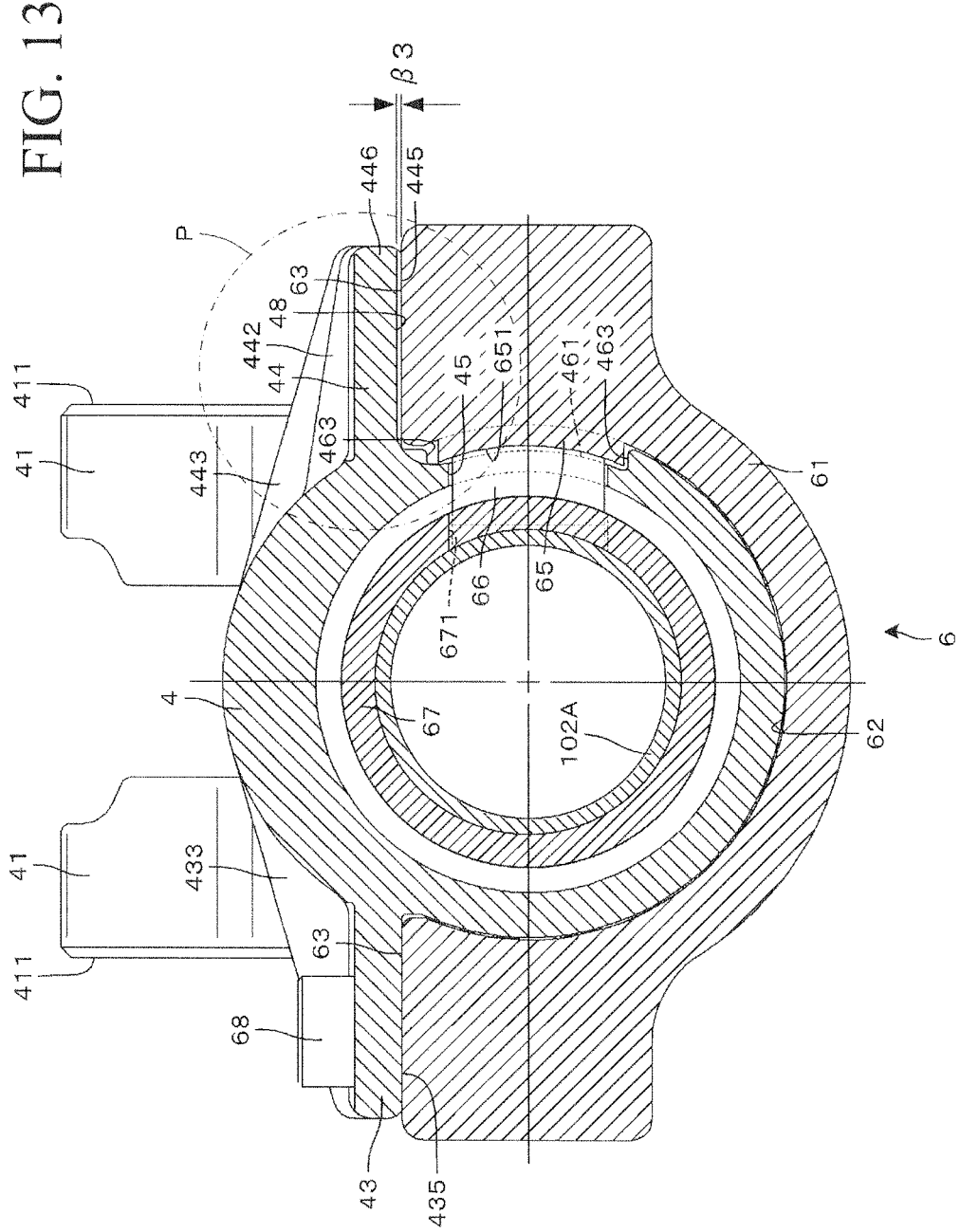
FIG. 13 is a cross-sectional view, including the steering lock device attached to the column assembly, taken along line B-B in FIG. 10.
Figure 14:
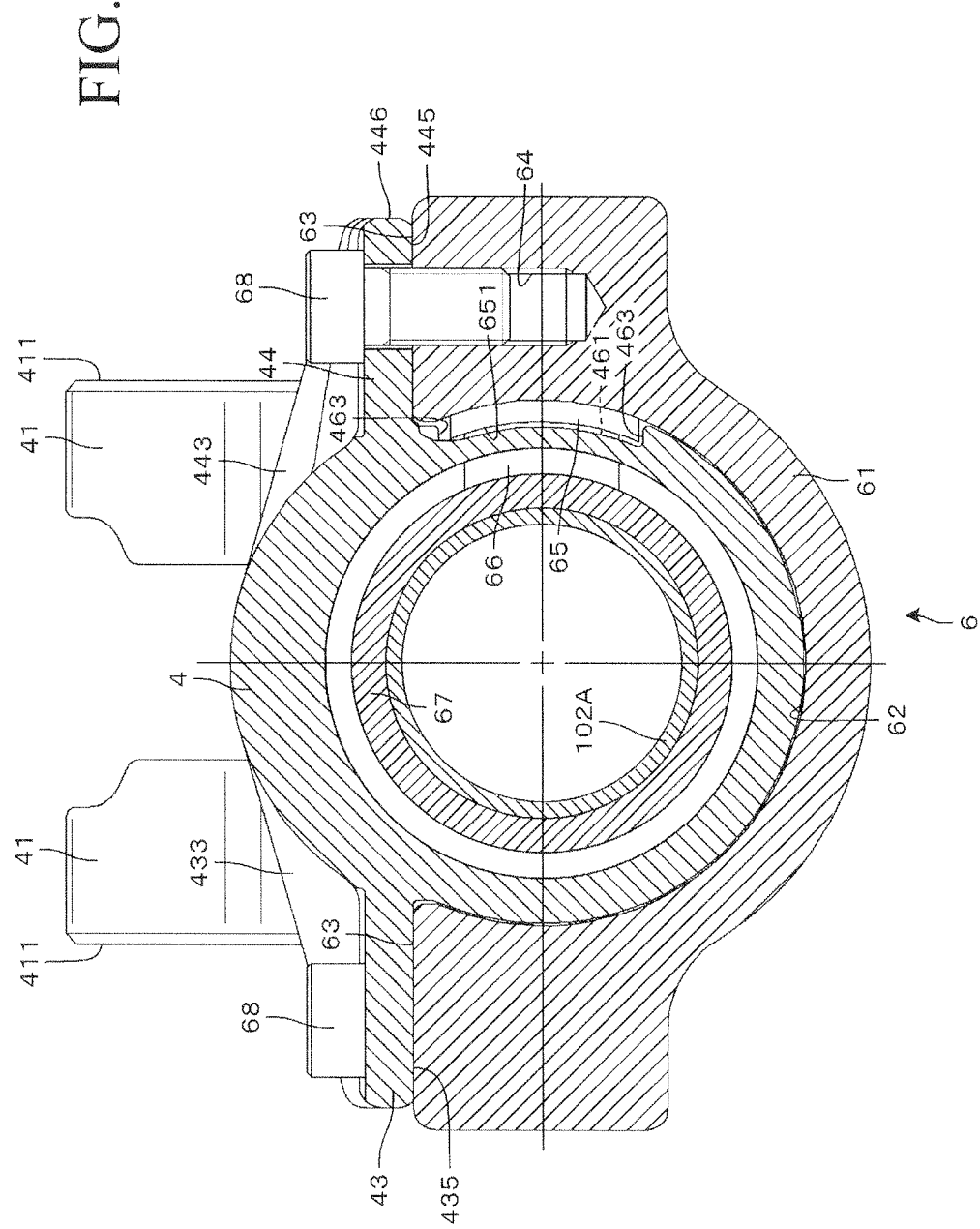
FIG. 14 is a cross-sectional view, including the steering lock device attached to the column assembly, taken along line C-C in FIG. 10.
Figure 15:
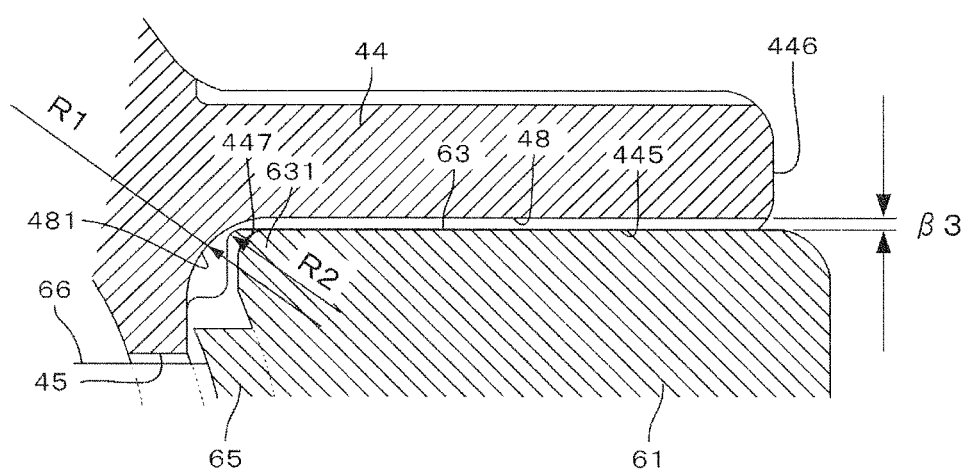
FIG. 15 is an enlarged cross-sectional view of portion P shown in FIG. 13.

At this time, as shown in FIG. 12, slight clearances β1 and β2 in the vehicle height direction are formed between side surfaces 463 of the guide groove 46 and side surfaces 652 (see FIG. 12) of the engaging convex part 65. A slight clearance is also formed between the outer periphery of the lock pin 66 and the through hole 45 in the outer column 4.

When, in a key-locked state (in a state where the lock pin 66 is engaged in the key lock hole 671), a large rotating torque is applied to the steering wheel 103, the lock pin 66 is subjected to a bending moment. Also, clamping the bolts 68 causes a clamping force toward the vehicle top to be applied to the housing 61 of the steering lock device 6.

Since, however, there is a slight clearance formed, in the vehicle height direction, between the outer periphery of the lock pin 66 and the through hole 45 and also between the guide groove 46 and the engaging convex part 65, the clamping force is born by the flange section 43 and ribs 432 and 433 and also by the flange section 44 and ribs 442 and 443 without any force applied to the through hole 45. The engaging convex part 65 is not fitted in the through hole 45, so that the through hole 45 is only required to be large enough to allow the lock pin 66 whose cross-sectional area is smaller than that of the engaging convex part 65 to come in and out. This makes it possible to reduce the cross-sectional area of the through hole 45 and thereby increase the strength of the outer column 4.

Figure 8:
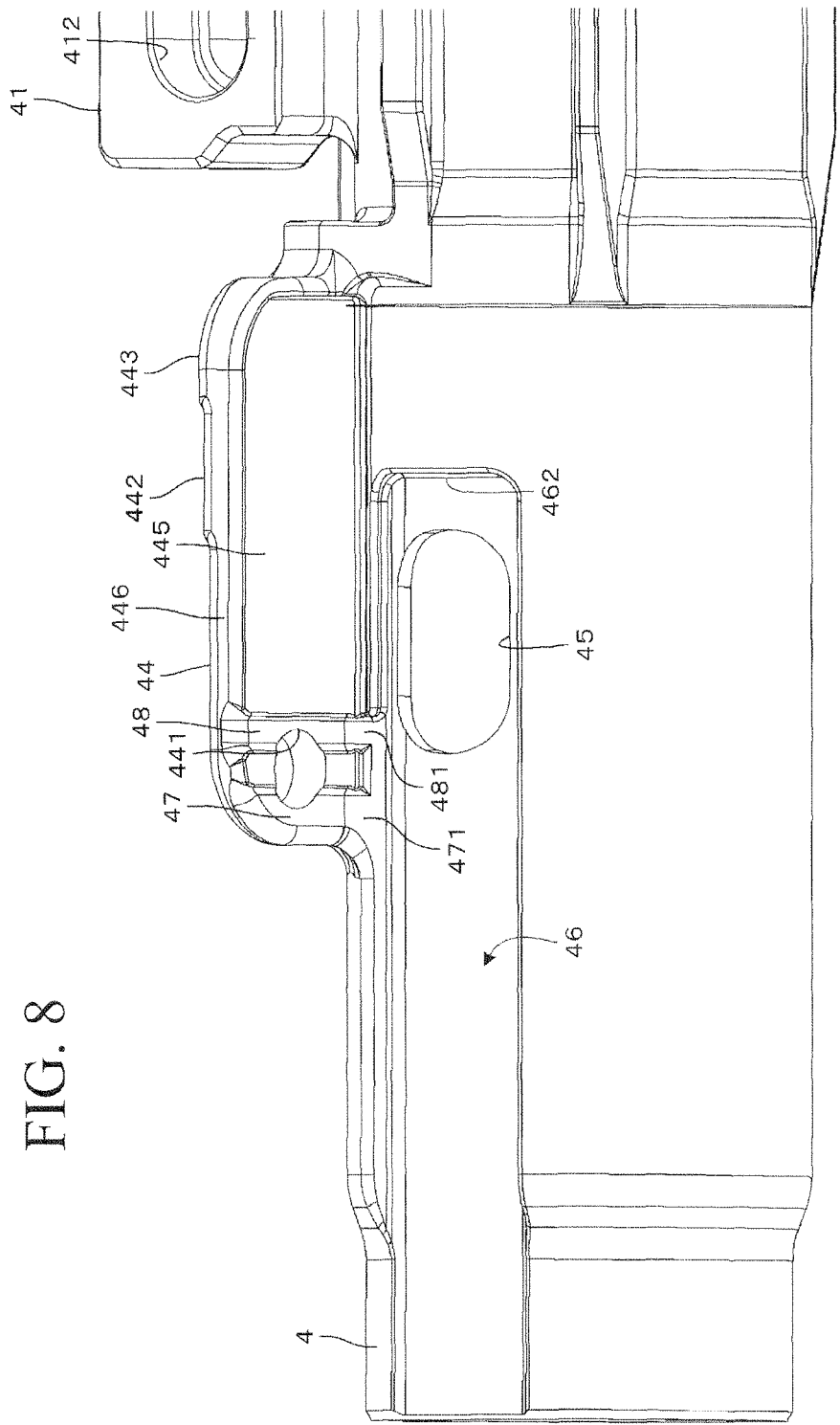
FIG. 8 is an enlarged perspective view, as seen from below on the right side toward the vehicle rear, of a portion around the flange section shown in FIG. 7 of the column assembly.
Figure 9:
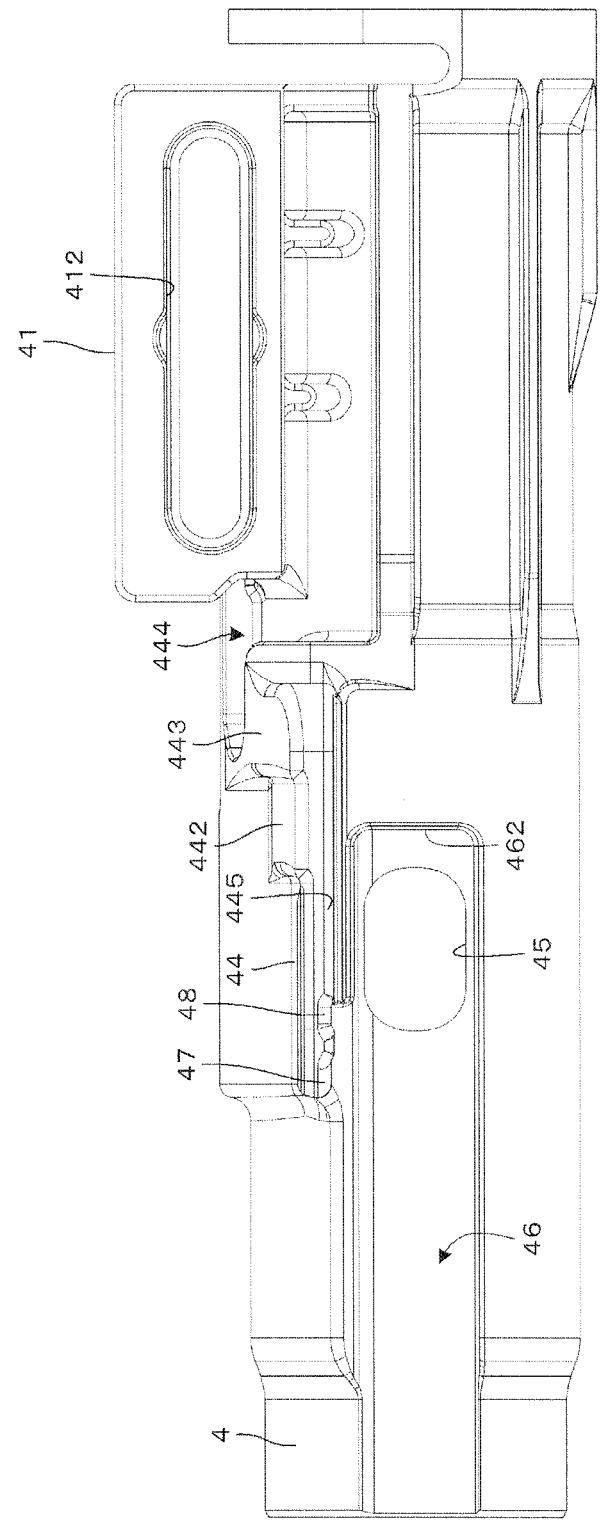
FIG. 9 is a front view, as seen from the right side in the vehicle width direction, of the column assembly shown in FIG. 4.
Figure 10:
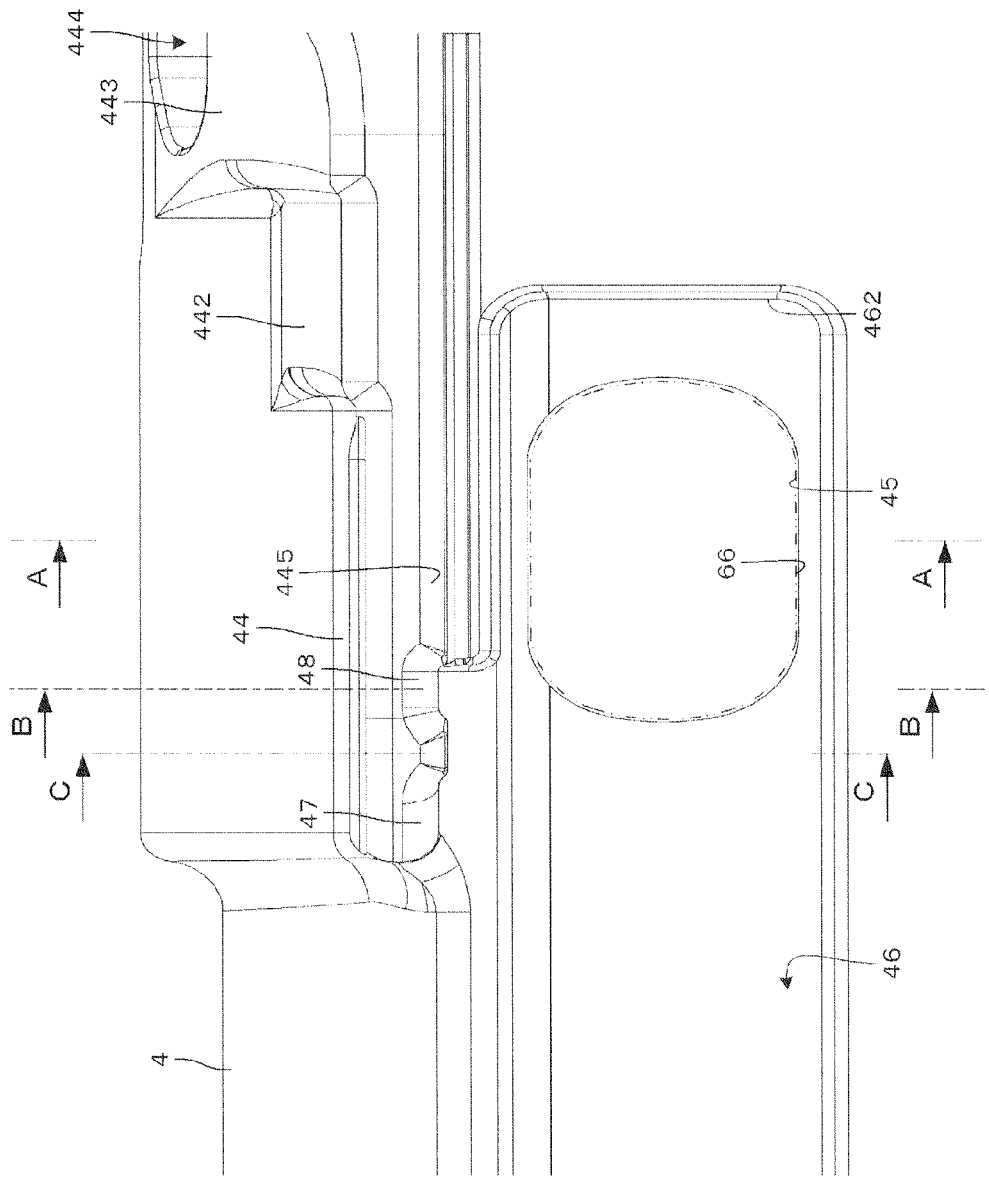
FIG. 10 is an enlarged front view, as seen from the right side in the vehicle width direction, of a portion around the flange section shown in FIG. 9 of the column assembly.
Figure 11:
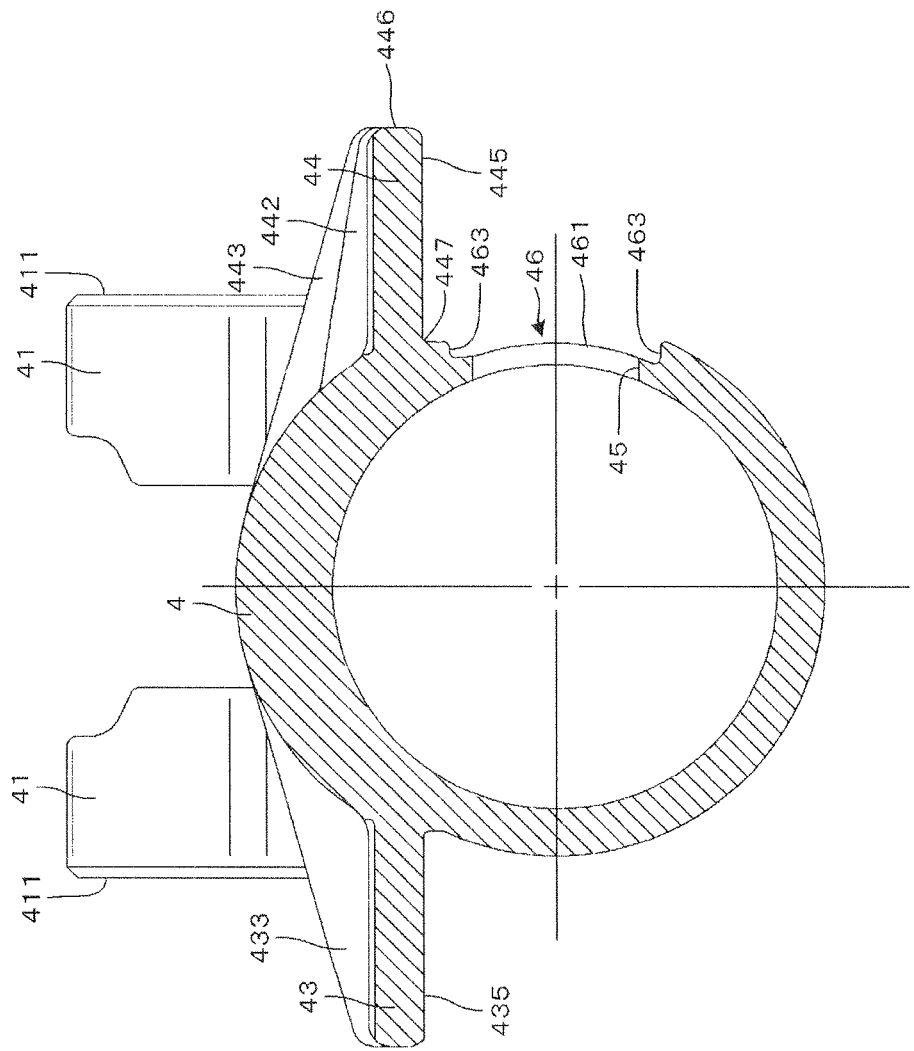
FIG. 11 is a cross-sectional view taken along line A-A in FIG. 10.

As shown in FIGS. 7, 8, 10, 13, and 15, the mounting surface 445 of the right flange section 44 has concave relief portions 47 and 48 formed near the bolt hole 441. The relief portions 47 and 48 are concave by β3 (see FIGS. 13 and 15) from the mounting surface 445. Of the two relief portions, the relief portion 47 is formed on the vehicle rear side (left side as seen in FIG. 8) of the bolt hole 441 and the relief portion 48 is formed on the vehicle front side (right side as seen in FIG. 8) of the bolt hole 441. The relief portions 47 and 48 are formed to extend from an outer side 446, in the vehicle width direction, of the flange section 44 to a base portion (where the flange section 44 and the outer periphery of the outer column 4 meet) of the flange section 44.

The relief portions 47 and 48 have round corners 471 and 481 formed where the relief portions 47 and 48 meet the outer periphery of the outer column 4, respectively. With the relief portions 47 and 48 concave by β3 from the mounting surface 445, radius R1 (see FIG. 15) of each of the round corners 471 and 481 of the relief portions 47 and 48 can be made larger than radius R2 of a round corner 447 of the mounting surface 445. This makes it possible to avoid interference between the relief portions 47 and 48 and the corner 631 at an inner end, in the vehicle width direction, of the right clamping surface 63 of the steering lock device 6.

When, in a key-locked state, a large rotating torque is applied to the steering wheel 103 causing a bending moment to be applied to the lock pin 66, a base portion near the bolt hole 441 of the flange section 44 is subjected to a large stress. The stress applied to the round corners 471 and 481 can, however, be reduced by allowing the round corners 471 and 481 to have a large radius R1.

The flange section 44 and ribs 442 and 443 are formed between the through hole 45 through which the lock pin 66 is moved in and out and the slit 42 for contracting the inner peripheral diameter of the outer column 4, so that strength of the outer column 4 is increased. Hence, both the strength of the outer column 4 against the bending moment applied to the lock pin 66 in a key-locked state and the strength of the outer column 4 against telescopic clamping effected by contracting the inner peripheral diameter of the outer column 4 can be secured.

Even though, in the above embodiment, the relief portions 47 and 48 are formed near the bolt hole 441 formed in the mounting surface 445 of the right flange section 44, such relief portions may be formed near the bolt hole 431 formed in the mounting surface 435 of the left flange section 43. Such relief portions may even be formed both near the bolt hole 441 and near the bolt hole 431. Furthermore, even though, in the above embodiment, the outer column is made of an aluminum alloy, it may be made of a magnesium alloy or a resin.

REFERENCE SIGNS LIST

101 Steering Device
102 Steering shaft
102A Upper steering shaft
103 Steering wheel
104 Universal joint
105 Intermediate shaft
106 Universal joint
107 Steering gear
108 Tie rod
2 Mounting bracket for mounting to vehicle body
21 Clamping rod
22 Operation lever
23 Capsule
24 Side plate
25 Long tilt adjusting slot
26 Cam lock mechanism
3 Inner column (lower column)
4 Outer column (upper column)
41 Clamp member
411 Outer side
412 Long telescopic adjustment slot
42 Slit
421 Closed end
422 Parallel portion
43 Flange section
431 Bolt hole
432, 433 Ribs
434 Thin part
435 Mounting surface
44 Flange section
441 Bolt hole
442, 443 Ribs 444 Thin part
445 Mounting surface
446 Outer side in vehicle width direction
447 Round corner
45 Through hole
46 Guide groove
461 Bottom surface
462 Closed end
463 Side surface
47, 48 Relief portions
471, 481 Round corners
5 Assist device (steering assisting part)
51 Gear housing
52 Electric motor
6 Steering lock device
61 Housing
62 Circular concave surface
63 Clamping surface
631 Corner
64 Female thread
65 Engaging convex portion
651 Circular concave surface
652 Side surface
66 Lock pin
67 Key lock collar
671 Key lock hole
68 Bolt

The invention claimed is:

1. A steering device comprising:
a steering shaft which is axially rotatably supported by a column and which can be attached with a steering wheel at a portion thereof toward a vehicle rear side;
a steering lock device which is attached to the column and which causes a lock pin operated by operation of an ignition key to engage the steering shaft so as to lock the steering shaft not to allow the steering shaft to rotate;
a flange section formed integrally with the column to project radially outwardly from the outer peripheral surface of the column and including a mounting surface to which a housing to accommodate the steering lock device is attached;
a bolt hole which is formed in the flange section and through which a bolt for clamping the housing to the mounting surface is inserted;
a relief portion which is concavely formed on the mounting surface to be close to the bolt hole and which extends to a base portion of the flange section; and
a round corner portion formed in the relief portion to be where the relief portion meets the outer peripheral surface of the column,
wherein a radius of the round corner portion is larger than a radius of a round corner formed between the mounting surface and the outer peripheral surface of the column.

2. The steering device according to claim 1, wherein the relief portions are formed both on a side toward a vehicle front of the bolt hole and on a side toward a vehicle rear of the bolt hole.

3. The steering device according to claim 2, wherein a bending moment applied to the lock pin when the lock pin is engaged with the steering shaft is born only by the flange section.

4. The steering device according to claim 1, wherein the bolt hole is formed near an end portion, in a column axis direction, of the flange section.

5. The steering device according to claim 4, wherein a bending moment applied to the lock pin when the lock pin is engaged with the steering shaft is born only by the flange section.

6. The steering device according to claim 1, wherein a bending moment applied to the lock pin when the lock pin is engaged with the steering shaft is born only by the flange section.

7. The steering device according to claim 1, wherein the column is formed of an aluminum alloy or a magnesium alloy.

* * * * *